United States Patent [19]
Biedebach et al.

[11] Patent Number: 5,893,455
[45] Date of Patent: *Apr. 13, 1999

[54] COMPACT DISC PACKAGE WITH SPINE INSERT

[76] Inventors: David H. Biedebach, 816 W. Benjamin Ct.; Kevan M. Cajka, 121 Cedar Creek St., both of Franklin, Tenn. 37067

[*] Notice: This patent issued on a continued prosecution application filed under 37 CFR 1.53(d), and is subject to the twenty year patent term provisions of 35 U.S.C. 154(a)(2).

[21] Appl. No.: 08/898,416

[22] Filed: Jul. 3, 1997

[51] Int. Cl.⁶ .............................. B65D 85/57; B65D 51/04
[52] U.S. Cl. .................. 206/308.1; 206/232; 206/312; 206/472; 220/338; 220/340
[58] Field of Search ................... 206/308.1, 308.3, 206/309, 311, 312, 232, 459.5, 472; 229/406; 220/339, 338, 340

[56] References Cited

U.S. PATENT DOCUMENTS

| | | | |
|---|---|---|---|
| 1,445,593 | 2/1923 | Iscowitz | 206/472 X |
| 2,473,333 | 6/1949 | Geis et al. | 206/311 |
| 4,341,307 | 7/1982 | Shyers | 220/339 X |
| 4,356,918 | 11/1982 | Kable et al. | 206/308.3 X |
| 4,519,500 | 5/1985 | Perchak | 206/312 |
| 4,620,630 | 11/1986 | Moss . | |
| 4,706,813 | 11/1987 | Schneider et al. | 206/307 |
| 4,886,166 | 12/1989 | Bankner et al | 206/308.3 |
| 4,978,005 | 12/1990 | Sammet | 206/312 |
| 5,154,284 | 10/1992 | Starkey . | |
| 5,242,049 | 9/1993 | Mizuwo et al. | 206/308.3 |
| 5,253,751 | 10/1993 | Wipper . | |
| 5,263,581 | 11/1993 | Rosen . | |
| 5,291,990 | 3/1994 | Sejzer . | |
| 5,462,160 | 10/1995 | Youngs . | |
| 5,588,527 | 12/1996 | Youngs . | |

FOREIGN PATENT DOCUMENTS 0291664  11/1988  European Pat. Off. ............. 206/472

*Primary Examiner*—Bryon P. Gehman
*Attorney, Agent, or Firm*—Lucian Wayne Beavers; Waddey & Patterson

[57] ABSTRACT

A process for enhancing a package for a compact disc and product produced by such a process are described. The process includes the step of inserting an object into a void space of a spine in a package for a compact disc. The object can include at least one three-dimensional object. The process can further include the steps of adding additional three-dimensional objects into the void space of the spine of the package for the compact disc. The product is an improved compact disc package which includes a compact disc package having a spine, the spine including a void space; and, an object included within the void space. The object can be three-dimensional. The package can further comprise additional three-dimensional objects included within the void space. A three-dimensional insert for a compact disc package that is dimensioned to fit within a spine of the compact disc package is also described. Matter, such as a liquid, can be included within the insert. The insert can further include at least one object included within the matter and can further include additional objects within the matter.

18 Claims, 3 Drawing Sheets

COMPACT DISC PACKAGE WITH SPINE INSERT

BACKGROUND OF THE INVENTION

The present invention relates generally to packaging for compact disc products. More particularly, this invention pertains to a process for enhancing the packaging for a compact disc and a product made by the process.

It will be appreciated by those having ordinary skill in the field that the music industry goes to great lengths to market compact discs (CDs). Particularly, the music industry expends a great deal of resources and effort to include decorative art work on the cover of the CD package to draw the consumer's attention to the product. Indeed, the packaging of the compact disc product is often as important to the marketing of the product as the music recorded on the compact disc itself. This is equally true in other fields which sell compact disc recording media with pre-recorded information on the disc, including, but not limited to, the computer software industry and the motion picture industry. Indeed, with the current rapid pace of technological advancement, many other industries may well have the need to use compact disc packaging suitable for marketing efforts.

The standard compact disc package, an example of which is found in U.S. Pat. No. 4,978,005, the contents of which herein are incorporated by reference, includes a spine which has a void space within. In the traditional packaging this void space includes only that which is a part of the two-dimensional art work included in the standard packaging. Thus, the void space is not utilized productively in the marketing of the compact disc product.

What is needed, then, is an improved compact disc package that takes advantage of the void space on the spine of the package. This packaging is presently lacking in the prior art.

SUMMARY OF THE INVENTION

A process for enhancing a package for a compact disc is described. The process comprises the step of inserting an object into a void space of a spine in a package for a compact disc. The object can comprises at least one three-dimensional object. The process can further comprise the steps of adding additional three-dimensional objects into the void space of the spine of the package for the compact disc. The invention also comprises a product produced by these processes.

The invention comprises an improved compact disc package comprising a compact disc package having a spine, the spine including a void space; and, an object included within the void space. The object can be three-dimensional. The package can further comprise additional three-dimensional objects included within the void space.

This invention also comprises a three-dimensional insert for a compact disc package, the insert dimensioned to fit within a spine of the compact disc package. Matter, including fluids, substances, and solid matter can be included within the insert. The insert can further comprise at least one object included within the matter and can further comprise additional objects within the matter.

Accordingly, it is an object of this invention to provide an improved compact disc package.

It is an object of this invention to provide an improved compact disc package that is suitable for use in any applicable industry, including, but not limited to, the music industry, the computer software industry, the motion picture industry, and other like industries.

It is a further object of this invention to provide an improved compact disc package which uses the void space in the spine of the traditional compact disc package.

It is a further object of this invention to provide an improved compact disc package which includes an object in the spine of the package.

It is a further object of this invention to provide a process for making an improved CD package.

Other objects in the advantage will be apparent from the foregoing detailed description.

DESCRIPTION OF THE PREFERRED EMBODIMENTS

Figure 1:
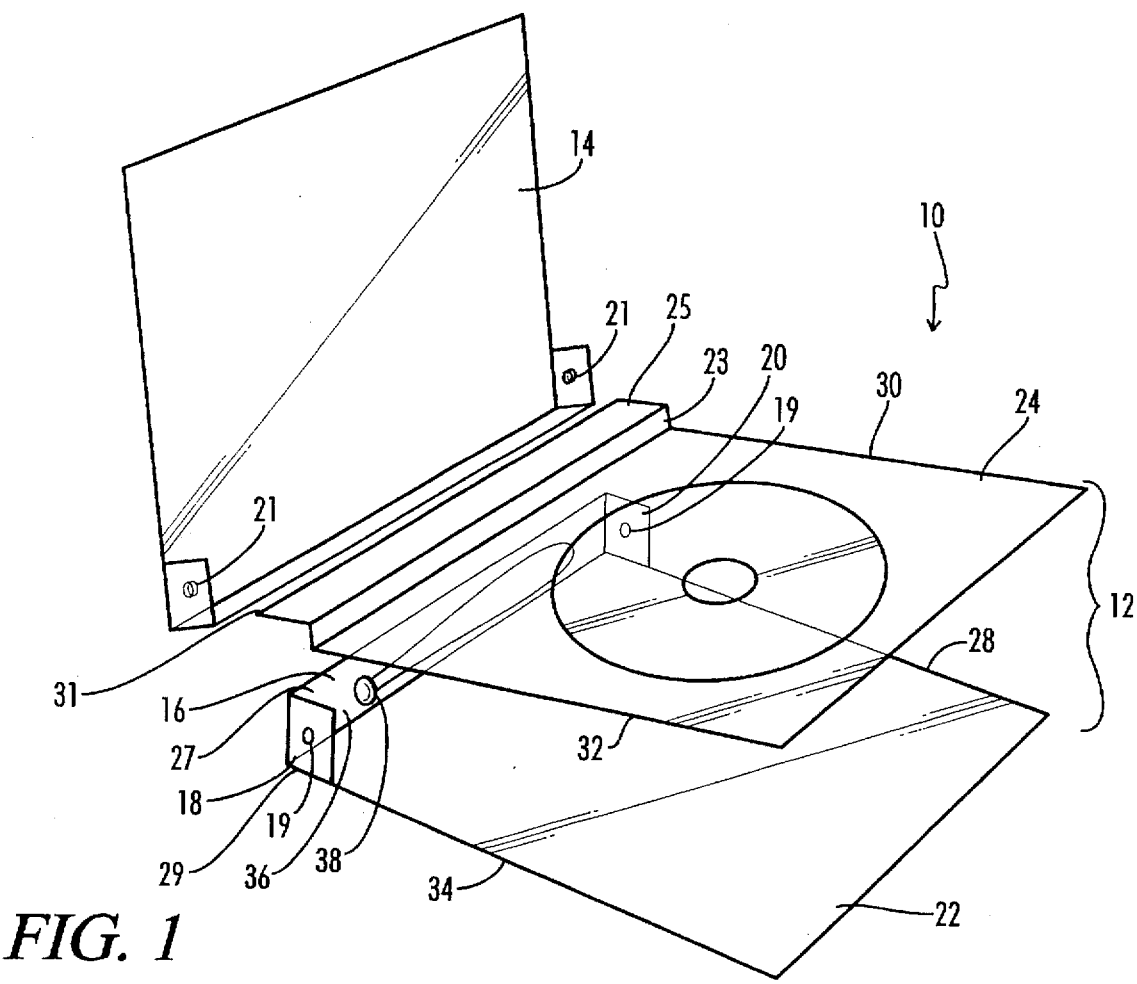
FIG. 1 is an exploded view of the improved CD packaging of this invention.

Referring now to the drawings, wherein like reference numerals refer to like parts throughout, the improved CD package of this invention is referred to generally at 10. Package 10 comprises a tray 12, lid 14 and spine 16. This is the standard configuration for a standard compact disc case as described in U.S. Pat. No. 4,978,005, the contents of which are herein incorporated by reference. It is preferred that all parts of package 10 comprises a clear plastic material, as is also conventional.

Referring particularly to FIG. 1, tray 12 further comprises lower tray section 22 and upper tray section 24. Lower tray section 22 and upper section 24 are snapped together on the top edge 28 of lower tray section 22 and top edge 30 of upper tray section 24 and along bottom edge 32 of upper tray section 24 and bottom edge 34 of lower tray section 22. This is conventional to a compact disc package. Lower tray section 22 includes rear vertical wall 27; vertical upper end wall 18 and in vertical lower end wall 20 along its left edge 29. Upper tray section 24 includes vertical wall 23 and horizontal wall 25 along its left edge 31. When tray sections 22 and 24 are snapped together, walls 18, 20, 23, 25 and 27 define spine 16 as well as void space 36 within spine 16. It will be apparent that a hollow insert may be attached to the inner surface of the void space to form a new void for receiving another insert.

Figure 2:
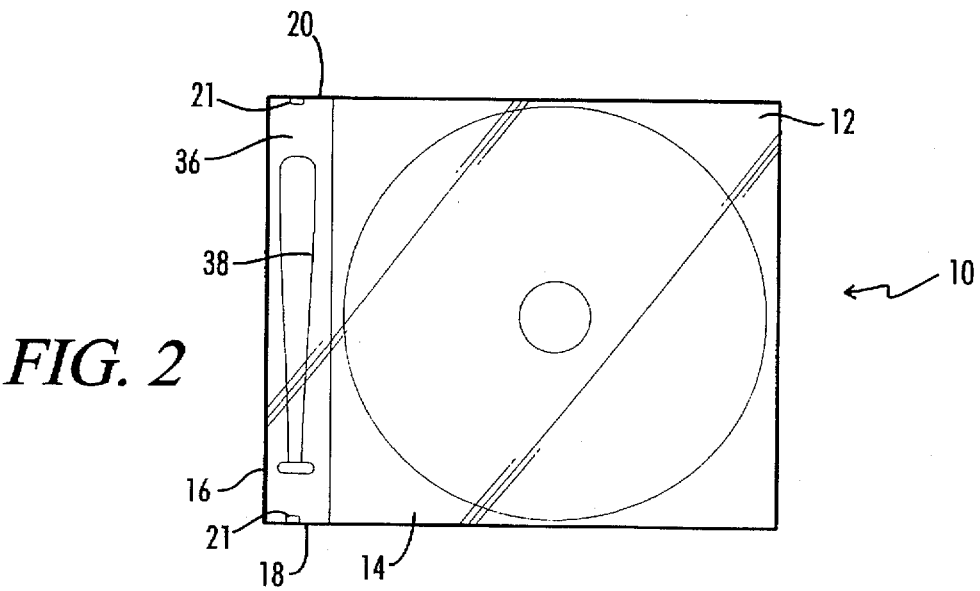
FIG. 2 is a front view of the improved CD packaging of this invention.

Continuing on FIG. 1, lid 14 is pivotally mounted via tabs 21 through bores 19 in vertical upper end wall 18 and in vertical lower end wall 20 of spine 16. Lid 14 covers tray 12 in a conventional manner when closed. Referring now to FIGS. 1 and 2, in the process of this invention an insert 38 is placed within the void space 36 prior to snapping tray sections 22 and 24 together.

Figure 3:
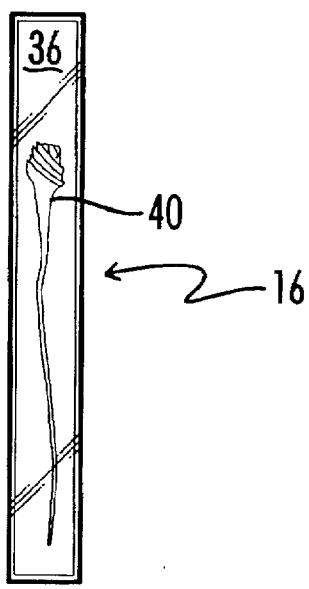
FIG. 3 is a front view of the spine of the improved CD packaging of this invention, including an insert according to the process of this invention.
Figure 4:
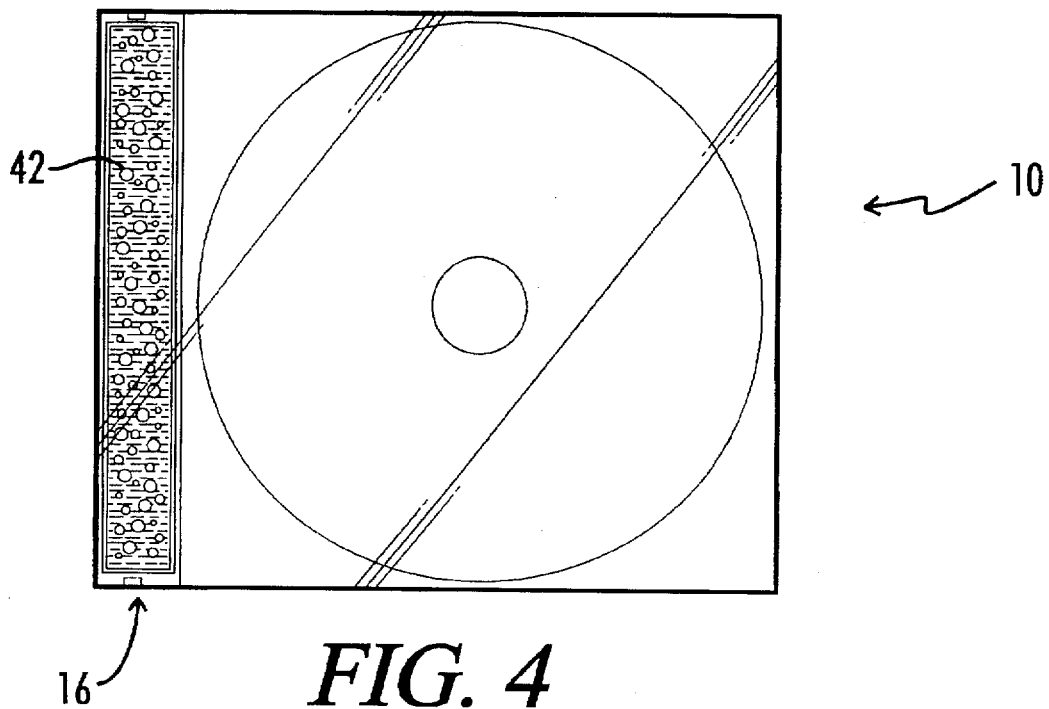
FIG. 4 is a front view of the improved compact disc package made according to the process of this invention wherein the insert in the spine of the package is a standardized matter-filled insert.

As shown in FIG. 3, insert 38 can comprise a decorative article such as a rose 40. As shown in FIG. 4, the insert can comprise a matter filled insert 42 mounted within spine 16 of package 10. Further described in FIG. 5, the matter filled insert 42 can be standardized to fit within spine 16 of standard CD packages. Preferred standardized dimensions are approximately 4.5 inches long×7/16 inches wide×1/4 high. Such a standardized insert 42 is another aspect of this invention and will facilitate mass production of inserts for compact disc packaging. This will provide for the efficient production of the improved compact disc packaging of this invention.

Figure 5:
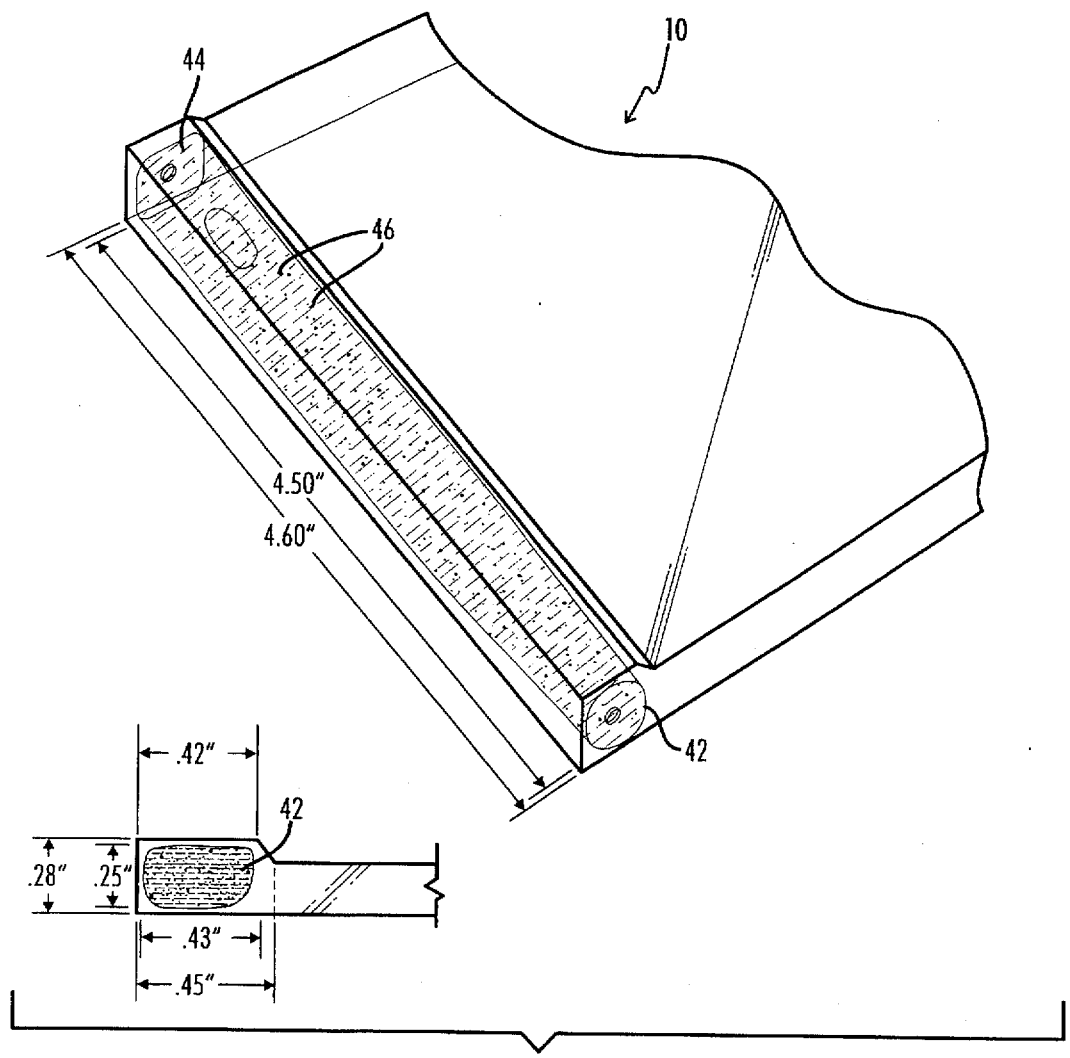
FIG. 5 describes the dimensional details of the spine and insert of the compact disc package of the invention.

As seen in FIG. 5, insert 42 includes matter 44. In this example, matter 44 is a liquid. However, matter of all types, viscosity, and substance can be included within the insert 42. Matter 44 can thus include fluids, including colored gas, and of all types and viscosity; non-liquid objects and substances; and combinations of each. The insert 42 can thus include other decorative items such as glitter particles 46.

A wide variety of three-dimensional items can be inserted within the void space 36 of spine 16. Such items can include antique keys, tiny zebras, glitter particles and even tiny plastic soda bottles. Other examples would be readily apparent to those having ordinary skill in the art. It will also be apparent from the inserts shown in the figures that the inserts are all readily distinguishable from title cards. This allows a consumer to distinguish this particular CD from the myriad of CD's offered for sale even if the consumer forgets the title of the CD.

Thus, although there have been described particular embodiments of the present invention of a new and useful "Process for Enhancing the Packaging for a Compact Disc and Product Made by Said Process", it is not intended that such references be construed as limitations upon the scope of this invention except as set forth in the following claims.

What is claimed is:

1. A method of enhancing a (CD) package comprising the steps of:
    a. providing a lower tray section having a rear vertical wall;
    b. placing a three-dimensional object in the lower tray section near the rear vertical wall; and
    c. attaching an upper tray section having a vertical wall and a horizontal wall to the lower tray section to form a generally rectangular spine, including the rear vertical wall, and the upper tray section horizontal and vertical walls, the upper tray section horizontal wall being perpendicular to the lower tray section rear vertical wall, and the spine defining a void space with the three-dimensional object in the void space.

2. The method of claim 1, further comprising the step of orienting the upper tray section vertical wall such that the upper tray section vertical wall is parallel to the rear vertical wall upon attaching the upper tray section to the lower tray section.

3. The method of claim 1, further comprising the step of pivotally mounting a lid to the lower tray section near the rear vertical wall.

4. The method of claim 1, wherein the three-dimensional object is hollow.

5. The method of claim 4, further comprising the step of filling the hollow three-dimensional object with a fluid.

6. The method of claim 1, wherein the three-dimensional object is a multi-faceted three-dimensional object.

7. The method of claim 1, further comprising the steps of: forming a portion of the generally rectangular spine from a clear material; and allowing the three-dimensional object to be visible through the clear portion of the generally rectangular spine.

8. A (CD) package comprising:
    a lower tray section having a rear vertical wall, a vertical first end wall extending perpendicularly from the rear vertical wall, and a vertical second end wall extending perpendicularly from the rear vertical wall at a spaced distance from the vertical first end wall and parallel to the vertical first end wall;
    an upper tray section having a horizontal wall and a vertical wall, the upper tray section attached to the lower tray section, the upper tray section horizontal wall and vertical wall oriented such that the upper tray section horizontal wall is perpendicular to the lower tray section rear vertical wall, the lower tray section vertical first end wall, and the lower section vertical second end wall, wherein the upper tray section and the lower tray section define a void space between the lower section vertical first end wall and the lower section vertical second end wall; and
    a three-dimensional insert positioned in the void space.

9. The CD package of claim 8, wherein the three-dimensional insert is hollow.

10. The CD package of claim 9, wherein the hollow insert is filled with a fluid.

11. The CD package of claim 10, wherein the hollow insert is filled with decorative items.

12. The CD package of claim 9, wherein the hollow insert is filled with decorative items.

13. The CD package of claim 8, wherein the upper tray section vertical wall is perpendicular to the upper tray section horizontal wall.

14. A (CD) package comprising:
    a lower tray section having a rear vertical wall, a vertical first end wall perpendicular to and attached to the rear vertical wall, and a vertical second end wall attached to the rear vertical wall at a spaced distance from and parallel to the vertical first end wall;
    an upper tray section having a clear horizontal wall and a vertical wall connected to the clear horizontal wall, the upper tray section being attached to the lower tray section wherein the upper tray section clear horizontal wall is positioned perpendicular to the lower tray section rear vertical wall, the lower tray section vertical first end wall, and the lower tray section vertical second end wall, and wherein the upper section tray and the lower section tray define a void space between the vertical first end wall and the vertical second end wall; and
    a first three-dimensional insert located in the void space.

15. The CD package of claim 14, further comprising a second three-dimensional insert located in the void space.

16. The CD package of claim 14, wherein the first insert is hollow.

17. The CD package of claim 16, wherein the hollow first insert is filled with a liquid.

18. The CD package of claim 14, wherein the lower section rear vertical wall is a clear material.

* * * * *